United States Patent Office 3,637,752
Patented Jan. 25, 1972

3,637,752
METHYLENEDIOXY BENZENE ETHERS
John B. Siddall, Palo Alto, Calif., assignor to Zoecon
Corporation, Palo Alto, Calif.
No Drawing. Filed May 18, 1970, Ser. No. 38,503
Int. Cl. C07d 13/10
U.S. Cl. 260—340.5    5 Claims

ABSTRACT OF THE DISCLOSURE

Method for the control of bugs of the family Miridae using methylenedioxyphenyl ethers and compositions therefor.

This invention relates to a novel method for the control of Miridae bugs, compositions therefor and compounds. More particularly, the present invention relates to the control of Miridae bugs by use of an effective amount of a compound selected from those of the formulas A and B:

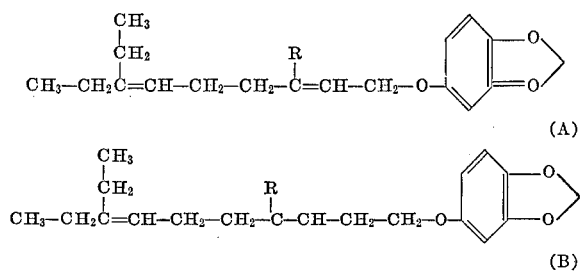

wherein R is methyl or ethyl.

The compounds of Formulas A and B are prepared according to the following outlined synthesis wherein R is as defined above, X is bromo or chloro and W is the group:

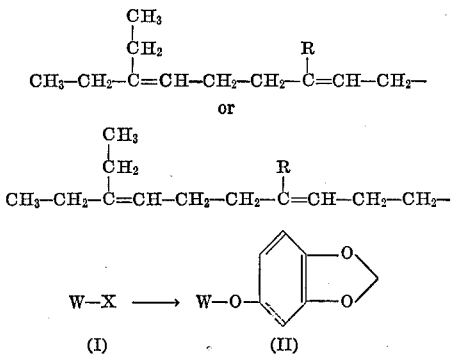

or

In the practice of the above process, a dienyl bromide or dienyl chloride of Formula I is reacted with a salt of sesamol formed by the reaction of sesamol with a base in an organic solvent, such as ether, tetrahydrofuran, dimethylacetamide, dimethylformamide, and the like. Suitable bases include alkali metal hydrides, alkali metal salts and alkaline earth metal salts, such as potassium carbonate, sodium carbonate, and the like.

The compounds of Formulas A and B are useful for the control of bugs of the family Miridae. The effectiveness of these compounds is attributed to their juvenile hormone activity. They are oils and can be applied using liquid or solid carriers and, preferably, at a time so as to contact the immature bug. Control can be achieved by such means as contact of the compound with the bug by direct topical contact, vapor contact, contact through ingestion or transmittal from one bug to another through physical contact. For example, topical application, as by spraying, of a compound of Formula A or B to bugs during the egg or larvae stage effectively inhibits normal development. In some cases, complete inhibition is obtained and in other cases partial inhibition occurs resulting in an imperfect bug which is unable to mature into an adult and/or unable to reproduce. The compounds can be used at very low dosage levels of the order of 0.001 ug. per bug. In the application of the compounds, the application can be such as to apply lower or higher dosages based on such factors as the estimated bug population, environmental conditions, locus of the bugs and previous trials. The compounds of Formulas A and B provide exceptional control for bugs of the family Miridae and especially for Lygus bugs (Lygus sp.), such as Lygus vasseleri, Lygus virens, Lygus apicalis, Lygus hesperus, Lygus elisis, Lygus pratensis and Lygus sallei. The family Miridae includes the genus Helopeltis, Callicratides, Volumnus, Lycidocoris, Heterocordylus, Ligidea, Campylomma, Creontiades, Adelphocoris, Megacoelum, Halticus, Psallus, Irbsia, Pycnoderes and Rhinocloa.

W. S. Bowers, "Juvenile Hormone: Activity of Aromatic Terpenoid Ethers," Science 164, 323–325 (Apr. 18, 1969) describes several aromatic terpenoid ethers which are structurally similar to the compounds of Formulas A and B. Bowers reports the finding of a high degree of morphogenetic activity on *Tenebrio molitor* and *Oncopeltus fasciatus*. Bowers also reports that the epoxides are approximately ten times more active than the dienyl or unepoxidized ethers of the aromatic compounds. Structurally, the compounds of Formulas A and B differ from those described by Bowers in that two ethyl groups are attached to the terminal carbon atom of the side chain. The compounds of Formulas A and B possess unusual properties not generally shared by the prior art compounds. Following the teachings of the prior art, it would be expected that the compounds of Formulas A and B would be about ten times less active than the corresponding epoxidized ethers; however, it has been discovered that the compounds of the present invention are more active than the epoxides thereof for Miridae bugs. The absence of a terminal epoxide is advantageous in that the compounds are considerably easier to prepare and the compounds are more stable. The dienyl compounds of the present invention possess excellent activity at several instars of the immature Miridae bug whereas the epoxidized ethers do not. This unusual property is of considerable significance in that the practical or field utility is greatly increased by reason of the excellent activity of the compounds of the present invention at various stages of the bug's life. The dienyl compounds of the present invention demonstrate lower mammalian toxicity than the epoxidized ethers. Another unusual and advantageous property of the dienyl compounds of this invention is that the dienes possess substantially greater selectivity in their action than the epoxidized ethers.

Sesamolyl ethers (3,4-methylenedioxyphenyl ethers) have been previously described as synergists for insecticides, such as the pyrethrins. See, for example, U.S. Pats. 2,764,517; 2,755,219; 2,832,792 and 2,920,993. The juvenile hormone activity of various sesamolyl ethers has been assayed against Tenebrio molitor L. and reported by Redfern et al., Journal of Economic Entomology 63, No. 2, 540 (April 1970).

Carriers, such as mineral and vegetable oils, e.g. refined kerosene, xylene, toluene, cottonseed oil, sesamol, and the like, and solid carriers, such as silica, talc, resins, synthetic polymers, can be used to dilute the compounds of Formulas A and B. Emulsifying agents and wetting agents can be used in formulations of the compounds of Formulas A and B to assist in application.

The following examples are provided to illustrate the preparation of the compounds of the present invention

EXAMPLE 1

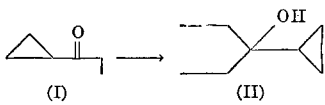

(A) The ethyl cyclopropyl ketone (I) (87.7 g.) is added to a cooled solution of 1.1 molar equivalents of ethyl lithium in benzene over 45 minutes. The reaction mixture is stirred slowly for about 16 hours at room temperature. The reaction mixture is then diluted with water and extracted with ether. The ethereal extracts are combined, washed with water and brine, dried over magnesium sulfate and the solvent evaporated to yield the cyclopropyl carbinol (II) which can be purified by distillation (B.P. 105°/121 mm. Hg).

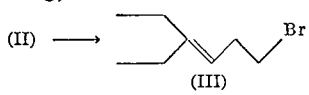

(B) To 82.8 g. of the cyclopropyl carbinol (II), cooled to 5°, is added 265 ml. of 48% HBr over ten minutes while maintaining the temperature at about 9°. The reaction mixture is stirred for 30 minutes at a temperature of about 7° and then poured into about 100 ml. of water. The organic layer is decanted and the aqueous phase extracted with pentane (3×100 ml.). The combined pentane extracts are washed with water, brine, saturated sodium bicarbonate, water and brine, dried over sodium sulfate and the solvent evaporated. The combined organic materials are purified by distillation to yield 1-bromo-4-ethylhex-3-ene (III), B.P. 105°/50 mm. Hg.

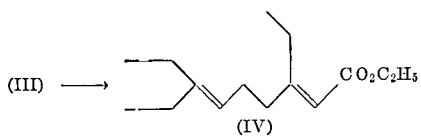

(C) To 14.5 g. of magnesium in 70 ml. of ether, under argon, is slowly added 77.3 g. of III in 710 ml. of ether over 24 hours with stirring.

A mixture of 41.5 g. of cuprous iodide, tetramethylethylenediamine (50.7 g.) and about 1.0 l. of ether is cooled to −80° and then 540 ml. of above-prepared Grignard is added. The reaction mixture is stirred for two hours and 25.4 g. of ethyl pent-2-ynoate is added. Then the reaction mixture is stirred for 1.5 hours while maintaining the temperature at about −80°. Ethanol (20 ml.) is added and the mixture poured into one liter of saturated ammonium chloride followed by extraction with ether. The combined ethereal extracts are washed with saturated ammonium chloride, 10% HCl, water and saturated sodium chloride and dried over sodium sulfate. Solvent is evaporated off to yield ethyl, 3,7-diethylnona-2,6-dienoate (IV), B.P. 89°–91°/0.16 mm. Hg.

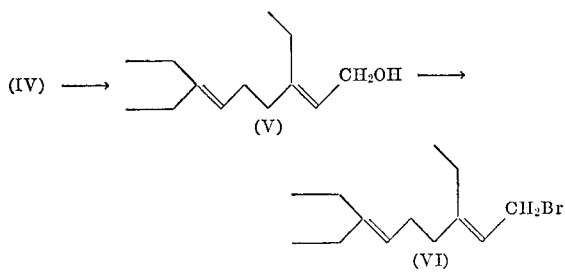

(D) A suspension of 1.5 g. of lithium aluminum hydride in 50 ml. of ether, under nitrogen, is cooled to 30° and then a solution of the ethyl ester (IV) in 20 ml. of ether is added over 45 minutes. After addition is complete, stirring is continued for ten minutes and the reaction quenched by addition of 10% ammonium chloride. The mixture is filtered and the solids washed with ether. The ether washings are combined, washed with 10% ammonium chloride, 10% HCl, water and saturated sodium chloride and dried over sodium sulfate. The solvent is removed to yield 3.7-diethylnona-2,6-dien-1-ol (V), B.P. 80°–82°/0.07 mm. Hg.

The alcohol (4.8 g.) is dissolved in 40 ml. of ether, cooled to −50° and 2.44 g. of phosphorus tribromide in 5 ml. of ether is added over 20 minutes. The reaction mixture is stirred for two hours, poured onto ice and extracted with ether. The ethereal extracts are combined, washed with 10% sodium carbonate, water and saturated sodium chloride, dried over sodium sulfate and the solvent concentrated to yield the bromide (VI).

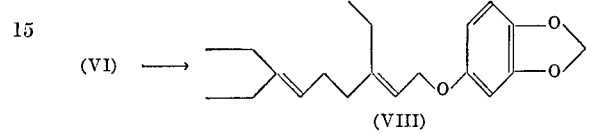

(E) To a suspension of 1 g. of sodium hydride (washed with pentane) in 10 ml. of tetrahydrofuran, under argon, and cooled to 4° is added 3.38 g. of sesamol in 15 ml. of tetrahydrofuran over one hour. The reaction mixture is stirred for about 16 hours.

To the above-prepared sodium salt solution of sesamol, cooled in an ice-bath, is added the ether concentrate of the allylic bromide from Part D over 1.5 hours. After 1.75 hours, the reaction is warmed to room temperature and allowed to stand about 16 hours. The reaction is poured into water and extracted with ether. The ethereal extracts are combined, washed with 10% NaOH, water and saturated sodium chloride, dried over sodium sulfate and solvents evaporated to yield trans 1-(3′,7′-diethylnona-2′,6′-dienyloxy)-3,4-methylenedioxybenzene (VIII), B.P. 162°/0.055 mm. Hg in about 95% purity.

EXAMPLE 2

(A) To a suspension of 2 g. of magnesium in 15 ml. of dry ether is added 10 g. of 1-bromo-4-ethylhex-3-ene (II) in 85 ml. of ether dropwise overnight and then gently refluxed for three hours.

The thus-prepared Grignard is slowly added to 10 g. of cuprous iodide in 100 ml. of ether containing 15 ml. of tetramethylethylenediamine cooled to −78°. The mixture is held for two hours at −78° and then one hour at −50° to −40°. The temperature is lowered to −78° and 3.6 g. of methyl 2-butynoate is slowly added. After 10 minutes, the reaction is quenched by the addition of 10 ml. of methanol, poured into saturated ammonium hydroxide and extracted with ether. The crude product is distilled under pressure and the residue chromatographed on a silica plate eluting with hexane:ether (9:1) to yield methyl 3-methyl-7-ethylnona-2,6-dienoate.

(B) Methyl 3-methyl-7-ethylnona-2,6-dienoate (6 g.) in 25 ml. of ether is added dropwise (about 70 minutes) to a suspension of 1.4 g. of lithium aluminum hydride in 50 ml. of ether at −30°. After about 30 minutes at −30°, the reaction is quenched with ammonium chloride, filtered and the solid washed with ether. The ether filtrate is washed with dilute HCl and brine, dried and solvent removed by distillation to yield 3-methyl-7-ethylnona-2,6-dien-1-ol.

(C) To a solution of 3.2 g. of 3-methyl-7-ethylnona-2,6-dien-1-ol in 30 ml. of dry ether cooled to −50° is added 0.85 ml. of phosphorus tribromide in 5 ml. of ether dropwise over 20 minutes. The reaction is continued for one hour, poured onto ice and extracted with ether. The ethereal extracts are washed with sodium carbonate and brine and evaporated to yield 1-bromo-3-methyl-7-ethylnona-2,6-diene.

(D) A mixture of 900 mg. of potassium carbonate, 276 mg. of sesamol and 2 ml. of dry dimethylformamide is stirred under nitrogen for about 15 minutes at room temperature. The mixture is cooled to about 0° and 510 mg. of the bromide of Part C in 1 ml. of dimethylformamide is added dropwise. The reaction is left overnight at room temperature and then washed up with 2 N sodium hydroxide and brine. The crude product is chromatographed using ethyl/hexane to yield 1 - (3'-methyl-7'-ethylnona-2',6'-dienyloxy) - 3,4 - methylenedioxybenzene (A; R is methyl).

EXAMPLE 3

To the Grignard of 1 - bromo-4-ethylhex-3-ene (prepared as described above) is added about one molar equivalent of methyl cyclopropyl ketone in ether two hours with stirring while maintaining the temperature at about 5–10°. When the reaction is complete, the temperature is allowed to rise to room temperature and the reaction poured into ammonium chloride. The crude product is worked up by extraction with ether and distillation to yield the carbinol (IX).

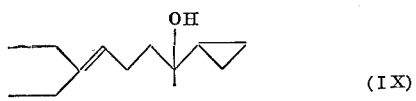
(IX)

The carbinol (IX) is reacted with 48% hydrogen bromide using the procedure of Example 1–B to yield 1-bromo-4-methyl-8-ethyldeca-3,7-diene (IX).

The bromide (X) is reacted with the sodium salt of sesamol using the procedure of Example 1–E to yield 1-(4' - methyl-8'-ethyldeca-3',7'-dienyloxy)-3,4-methylenedioxybenzene (B; R is methyl).

The sesamolyl ether (B) in which R is ethyl is obtained by the process of this example using ethyl cyclopropyl ketone in place of methyl cyclopropyl ketone.

The processes described herein afford a mixture of the cis and trans isomers. Each of the isomeric compounds can be separated by gas-liquid chromatography or distillation. The compounds of the present invention are generally employed as a mixture of isomers for the control of Miridae bugs.

A liquid concentrate is prepared of 50 parts 1-(3',7'-diethylnona-2',6'-dienyloxy) - 3,4 - methylenedioxybenzene and 50 parts xylene. The concentrate is then diluted with water and/or organic liquid carriers together with wetting, dispersing or emulsifying agents, such as the alkyl or alkylaryl sulfonates, sodium lauryl sulfate, alkylaryl polyether alcohols, polyethylene oxides and other surface-active agents. The concentration of the foregoing compound or other compounds of the present invention in the dilution generally used for control of Miridae, such as Lygus bugs, is normally in the range of about 0.001% to 40%, usually 0.01% to 25%, depending upon such factors as the efficiency of the application apparatus and materials available. Concentrates can be formed using other carriers, such as kerosene, acetone, isopropyl alcohol, propylene glycol, cottonseed oil and toluene to contain from about 10–85% of the active ingredient. The concentrates are also used for preparing solid formulations in which case the concentrate, as is or diluted, is sprayed or mixed with solid carriers, such as kaolin, bentonite, talc, diatomaceous earth, pumice, silicas, granular polyvinyl chloride or other carriers. Wetting agents and other components, such as paraffin wax or chlorinated paraffin can be added to control the rate of vaporization. The amount of active ingredient in conjunction with solid carrier is normally about the same as with liquid carriers. A concentrate can be applied directly using ultra-low volume sprayers.

To a solution of 220 mg. of 1-(3',7'-diethylnona-2',6'-dienyloxy)-3,4-methylenedioxybenzene and 8 ml. methylene chloride, cooled to ice temperature, is added 141 mg. (one equivalent) of m-chloroperbenzoic acid. After 15 minutes, the reaction mixture is filtered into 10% sodium sulfite and is then washed with saturated sodium bicarbonate and dried over sodium sulfate. The crude product is chromatographed on Florisil eluting with hexane:ether (9:1) to yield 1-(3',7'-diethyl - 6',7' - oxidonon-2'-enyloxy)-3,4-methylenedioxybenzene.

The epoxides of the other compounds of Formulas A and B are prepared using the foregoing procedure.

What is claimed is:

1. A compound selected from those of the Formulas A and B:

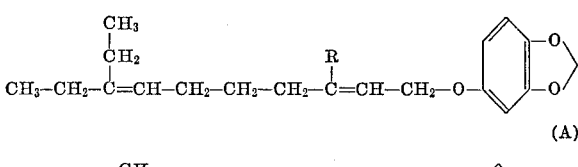

(A)

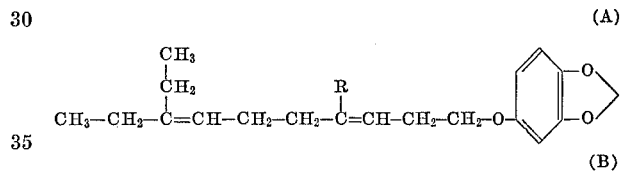

(B)

wherein R is methyl or ethyl.

2. A compound of the Formula A according to claim 1 wherein R is methyl.

3. A compound of the Formula A according to claim 1 wherein R is ethyl.

4. A compound of the Formula B according to claim 1 wherein R is methyl.

5. A compound of the Formula B according to claim 1 wherein R is ethyl.

References Cited

UNITED STATES PATENTS 3,184,516   5/1965   Chechak et al. __ 260—340.5 X

ALEX MAZEL, Primary Examiner

J. H. TURNIPSEED, Assistant Examiner

U.S. Cl. X.R.

424—282

UNITED STATES PATENT OFFICE
CERTIFICATE OF CORRECTION

Patent No. 3,637,752　　　　　　　　　Dated January 25, 1972

Inventor(s) John B. Siddall

It is certified that error appears in the above-identified patent and that said Letters Patent are hereby corrected as shown below:

Column 1, line 53, delete "or".
Column 5, line 10, after "ether" add --over--.
Claim 1, Formula A, that portion of the formula reading

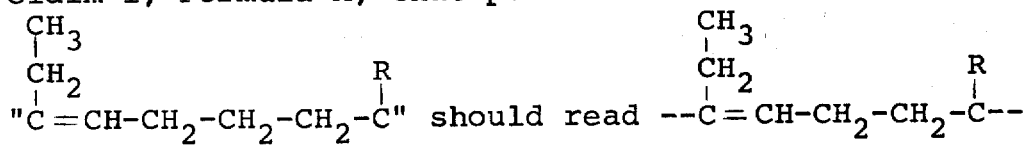

Signed and sealed this 29th day of October 1974.

(SEAL)
Attest:

McCOY M. GIBSON JR.　　　　　　　　C. MARSHALL DANN
Attesting Officer　　　　　　　　　Commissioner of Patents